(12) United States Patent
Aldrich et al.

(10) Patent No.: US 6,601,077 B1
(45) Date of Patent: Jul. 29, 2003

(54) DSP UNIT FOR MULTI-LEVEL GLOBAL ACCUMULATION

(75) Inventors: Bradley C. Aldrich, Austin, TX (US); Ravi Kolagotla, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,148

(22) Filed: Mar. 31, 2000

(51) Int. Cl.[7] .............................................. G06F 15/00
(52) U.S. Cl. ...................................... 708/201; 708/523
(58) Field of Search ................................. 708/521, 603, 708/690, 443, 201, 207; 348/699; 382/264; 712/22, 221

(56) References Cited

U.S. PATENT DOCUMENTS

| | | | | |
|---|---|---|---|---|
| 4,941,190 A | * | 7/1990 | Joyce ........................... | 382/264 |
| 5,448,310 A | * | 9/1995 | Kopet et al. ................... | 348/699 |
| 5,563,813 A | * | 10/1996 | Chen et al. .................... | 708/201 |
| 5,610,850 A | * | 3/1997 | Uratani et al. ................ | 708/671 |
| 5,793,661 A | * | 8/1998 | Dulong et al. ................ | 708/603 |
| 5,859,997 A | * | 1/1999 | Peleg et al. ................... | 712/221 |
| 6,282,556 B1 | * | 8/2001 | Chehrazi et al. ............. | 708/521 |
| 6,317,819 B1 | * | 11/2001 | Morton .......................... | 712/22 |
| 6,377,970 B1 | * | 4/2002 | Abdallah et al. ............ | 708/603 |
| 6,473,529 B1 | * | 10/2002 | Lin ............................... | 382/236 |

* cited by examiner

Primary Examiner—Chuong Dinh Ngo
Assistant Examiner—Chat Do
(74) Attorney, Agent, or Firm—Fish & Richardson P.C.

(57) ABSTRACT

In one embodiment, a digital signal processor (DSP) is described for multi-level global accumulation. The DSP includes a plurality of absolute difference determinators in a first stage. The absolute difference determinators may include arithmetic logic units (ALUs) in combination with multiplexers. By using multiple absolute difference determinators, the throughput of the DSP is increased. An existing multiplier may be reconfigured into an adder tree to process the absolute difference results obtained in the first stage. To further increase throughput, multiple DSPs with multiple absolute difference determinators may be operated in parallel.

10 Claims, 5 Drawing Sheets

DSP UNIT FOR MULTI-LEVEL GLOBAL ACCUMULATION

TECHNICAL FIELD

This invention relates to digital signal processors, and more particularly to digital signal processors for multi-level global accumulation.

BACKGROUND

Digital signal processing is concerned with the representation of signals in digital form and the transformation or processing of such signal representation using numerical computation. Digital signal processing is a core technology for many of today's high technology products in fields such as wireless communications, networking, and multimedia. One reason for the prevalence of digital signal processing technology has been the development of low cost, powerful digital signal processors (DSPs) that provide reliable computing capability to implement these products cheaply and efficiently. Since the development of the first DSPs in the early 1980's, DSP architecture and design has evolved to the point where even sophisticated real-time processing of video-rate sequences can be performed.

DSPs are typically generic and not optimized for a specific application such as video processing. When increased performance is necessary, a DSP may be paired with an application specific integrated circuit (ASIC) that is designed for a particular purpose. For example, a DSP in a video processing system may have an accompanying ASIC to accelerate the video processing functions. Although ASICs are effective at increasing the performance of different systems, the cost of an ASIC may be quite high. Further, because an ASIC is designed for a particular purpose, a circuit containing ASICs is generally not flexible in performing non-ASIC related tasks.

DESCRIPTION OF DRAWINGS

Features and advantages of the present invention will become apparent upon reading the following detailed description and upon reference to the accompanying drawings.

DETAILED DESCRIPTION

Figure 1:
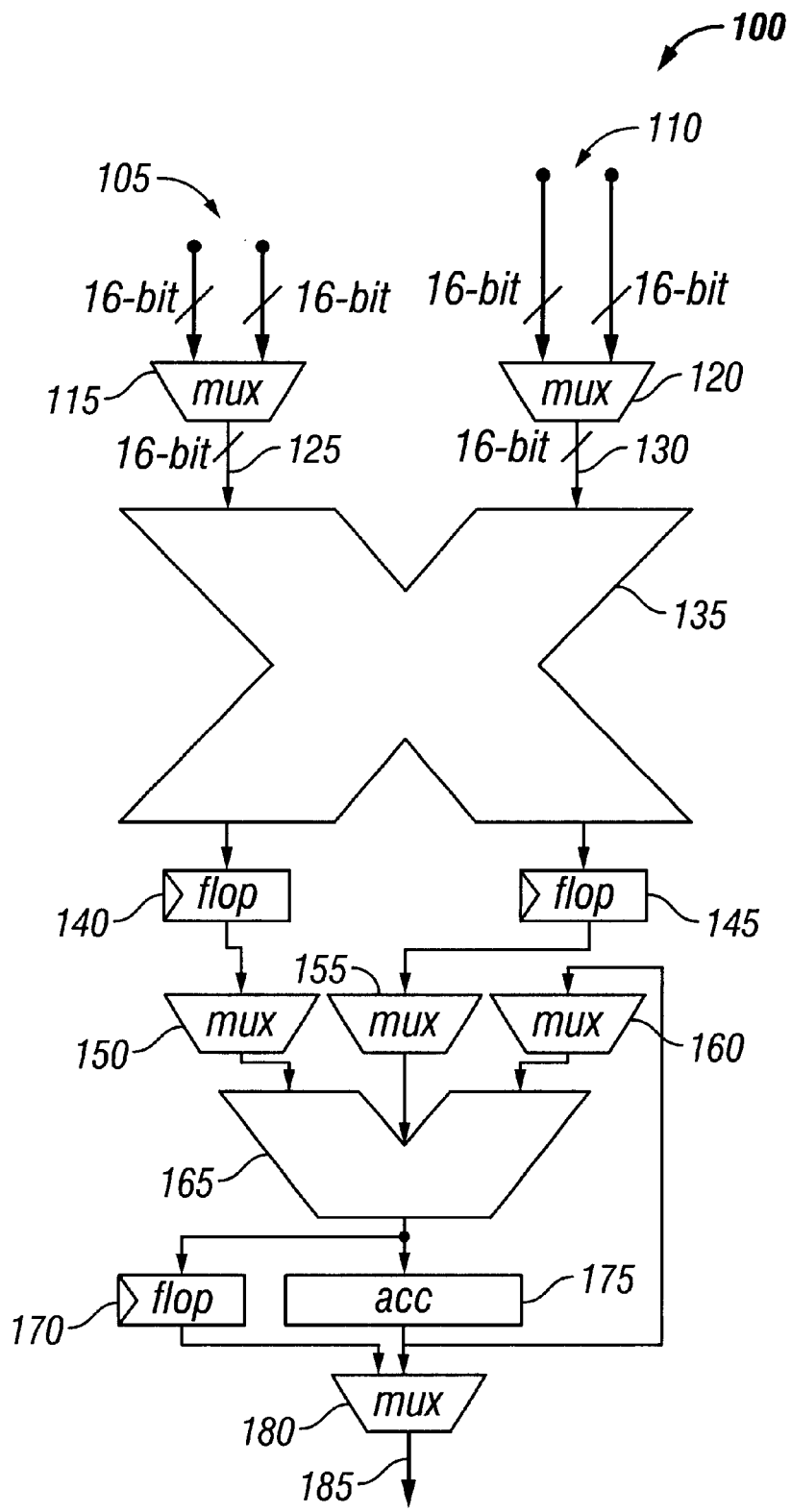
FIG. 1 is a schematic of a digital signal processor for general n-bit modes of operation in accordance with an embodiment of the present invention.

A general purpose digital signal processor (DSP) 100 is illustrated schematically in FIG. 1. The DSP 100 includes multiplexers 115, 120, 150, 155, 160, a multiplier 135, flops 140, 145, 170, an arithmetic logic unit (ALU) 165, and an accumulator 175. The DSP 100 processes N-bit data, with N equal to 16 for the exemplary DSP 100 illustrated in FIG. 1. It can be appreciated that the size of the data for which the DSP 100 is optimized is a matter of design choice. Furthermore, the scope of the present invention is not limited as to require each element.

The DSP 100 receives data in the form of 16-bit data 105, 110 from data buses. Each data bus provides a plurality of 16-bit data sets 105, 110 to the DSP 100. The plurality of 16-bit data sets 105 is input into the multiplexer 115 and the plurality of 16-bit data sets is input into the multiplexer 120. The multiplexer 115 selects a single 16-bit data set 125 from the plurality of 16-bit data sets 105. The multiplexer 120 selects a single 16-bit data set 130 from the plurality of 16-bit data sets 110. The selected 16-bit data sets 125, 130 are processed by the DSP 100.

The multiplier 135 receives the selected 16-bit data sets 125, 130 from the multiplexers 115, 120. The multiplier 135 may be configured to multiply two n-bit data sets. To ensure proper operation, the multiplier 135 can be at least 2N bits in size. In the present exemplary embodiment, the multiplier 135 is at least 32 bits in size to allow multiplication of two 16-bit numbers. Of course, the multiplier 135 can multiply two numbers of any size up to and including 16-bit numbers.

The result of the multiplication operation is transferred to the flops 140, 145. The flops 140, 145 are memory elements that utilize electronic latching circuits. The flops 140, 145 contain partial products from the multiplication process. The combination of the partial products in the flops 140, 145 equals the result of the multipliers 135. The flops 140, 145 pass the partial products to the multiplexers 150, 155. The multiplexers 150, 155, and 160 select the appropriate data to pass to the ALU 165. The multiplexer 160 receives as an input the value of the accumulator 175. If the result of the multiplier 135 alone is desired, the multiplexer 160 would not pass the data to the ALU 165. The ALU 165 performs basic arithmetic and logical operations. In one embodiment, the ALU 165 is constructed of full adders. Full adders add three bits at a time, and produce results in the form of a sum and a carry. The ALU 165 takes the result from the multiplier 135 and adds that result to the previous value of the accumulator 175 stored in the multiplexer 160.

The output of the ALU 165 is provided to a flop 170 and to the accumulator 175. The flop 170 has the result of the last value of the ALU 165. The accumulator 175 value represents a total of all of the previous results from the ALU 165. The most recent output of the ALU 165 is added to the accumulator 175, and the new accumulator value is then provided in a feedback loop to the multiplexer 160 for possible inclusion in the next ALU 165 operation. The new accumulator value is also provided as an input to the multiplexer 180. The value of the flop 170 may also be provided as an input to the multiplexer 180. The multiplexer 180 allows the DSP 100 to choose whether to output the value of the accumulator 175 or the most recent result from the ALU 165. Once selected, this data is sent to an output 185.

Figure 2:
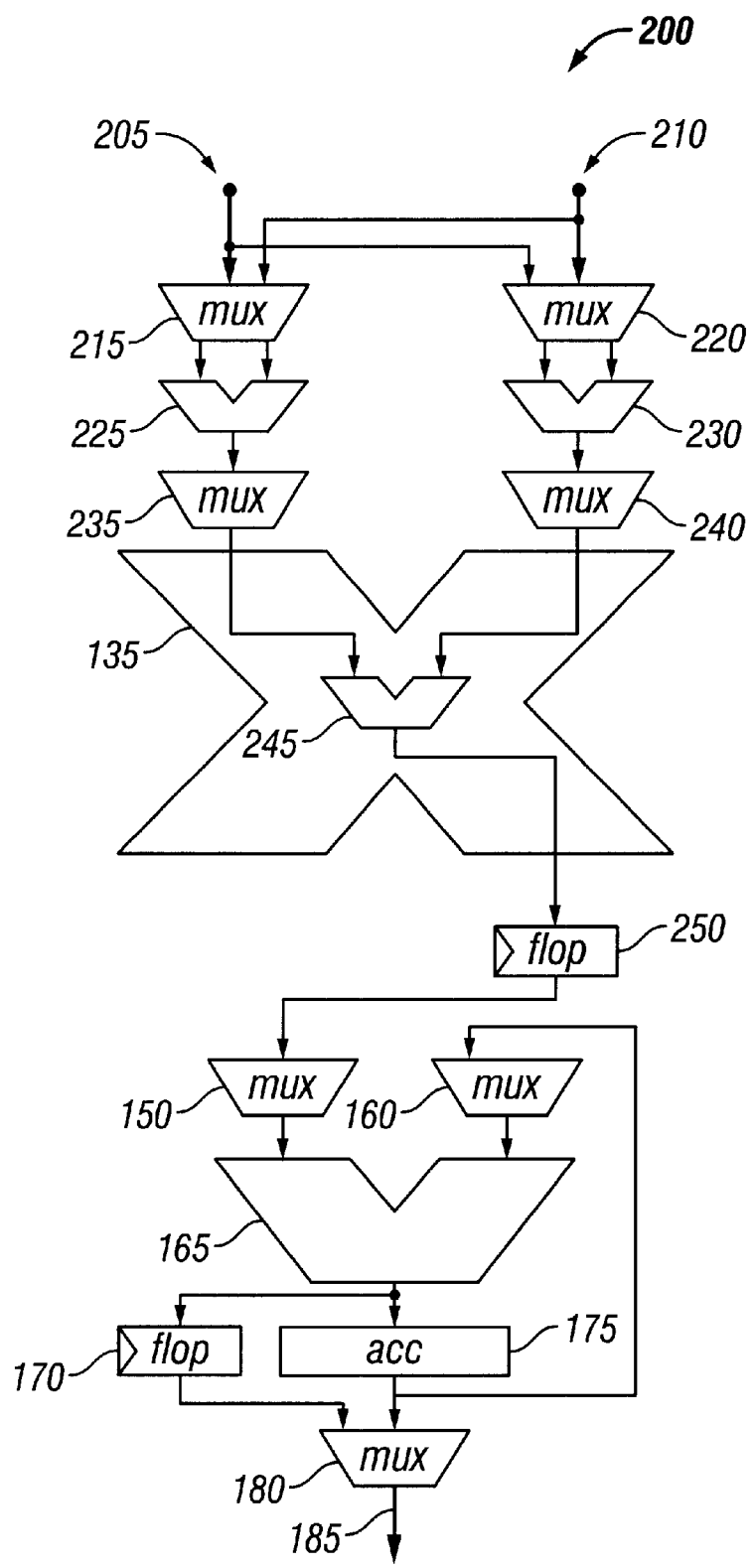
FIG. 2 a schematic of a digital signal processor for one-dimensional two-level global accumulation in accordance with an embodiment of the present invention.

FIG. 2 shows a schematic of a DSP 200 for one-dimensional, two level global accumulation according to an embodiment of the present invention. The DSP 200 may include multiplexers 150, 160, 180, 215, 220, 235, 240, 235, 240, flops 170, 250, arithmetic logic units (ALUs) 165, 225, 230, 245, and accumulator 175. The DSP 200 includes three pipe stages for increasing throughput while processing smaller data words. The multiple stages of the DSP 200 allow processing of lower bit data sets at an increased level of efficiency.

The DSP 100 of FIG. 1 is intended to process N-bit data sets. Although the DSP 100 may process data of less than N-bit data sets, it does so at a reduced efficiency.

The first stage of the DSP 200 includes the ALUs 225, 230 and multiplexers 215, 220, 235, 240. In the first stage, data from two N-bit data buses 205, 210, providing a total of 2N bits of data, is input into each of the multiplexers 215, 220. Each multiplexer 215, 220 then selects two (N/2)-bit data sets for processing. In the embodiment shown in FIG. 2, the multiplexers 215, 220 each select two 8-bit data sets for further processing. Each of the 8-bit data sets may represent, for example, one pixel in a video application.

The DSP 200 may be used to calculate a sum of absolute differences (SAD) for pixel pairs in a video environment. The ALU 225 receives a pair of the (N/2)-bit data sets from the multiplexer 215. The pair of (N/2)-bit data sets may represent a pair of pixels in a video embodiment. The ALU 230 receives a second pair of the (N/2)-bit data sets from the multiplexer 230. The ALUs 225, 230 in combination with the multiplexers 235, 240 process the (N/2)-bit data sets to obtain an absolute difference between the data sets. To obtain the SAD for the entire image frame contained on the data buses 205, 210, each of the absolute differences of the pixels is accumulated, thereby requiring multiple iterations from the DSP 200. A low SAD indicates that the first frame is similar to the second frame. As the SAD increases, the reliability of the estimation of the second frame diminishes.

The pixel absolute differences are processed in a second stage that includes the ALU 245 and the flop 250. The ALU 245 is configured from the multiplier 135 of DSP 100. The two absolute differences of the (N/2)-bit data set are received by the ALU 245. The ALU 245 processes the data and provides an output to the flop 250. This result is provided to the third stage of the DSP 200.

The third stage of the DSP 200 maintains a continual total of each of the (N/2)-bit data set absolute differences calculated by the DSP 200. The third stage includes the multiplexers 150, 160, 180, the ALU 165, the flop 170, and the accumulator 175. The operation of the third stage is described above with reference to FIG. 1. When all the data sets have been processed, the output 185 is the SAD for the image frames that were present on the data buses 205, 210.

Figure 3:
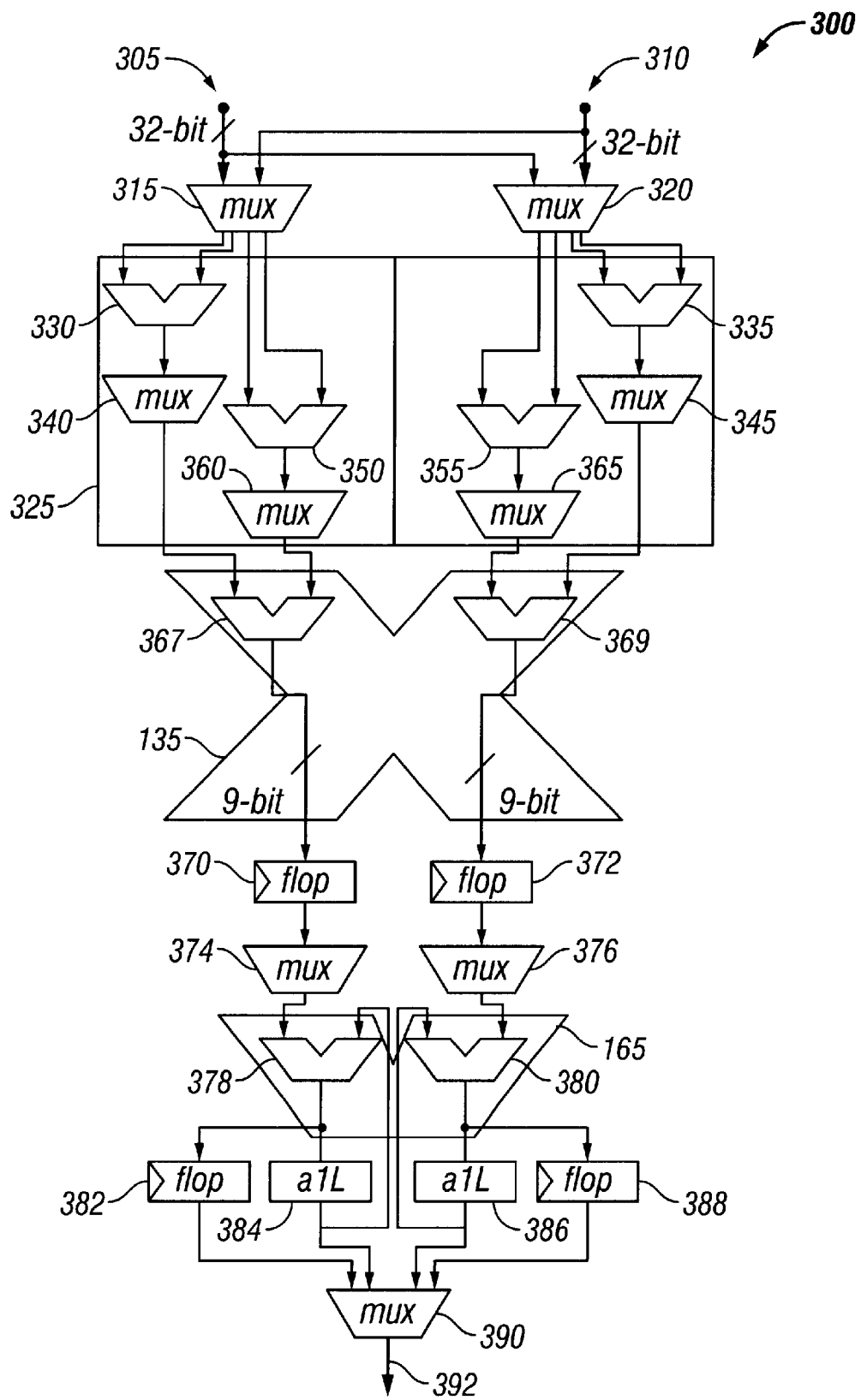
FIG. 3 is a schematic of a digital signal processor for one-dimensional two-level dual global accumulation in accordance with an embodiment of the present invention.

FIG. 3 is a schematic of a DSP 300 for one-dimensional, two level global accumulation including increased throughput. The DSP 300 may include multiplexers 315, 320, 340, 345, 360, 365, 374, 376, 390, ALUs 330, 335, 350, 355, 367, 369, 378, 380, flops 370, 372, 382, 388, and accumulators 384, 386. The DSP 300 receives data from data buses 305, 310. The data buses 305, 310 are 2N bit data buses, or 32 bit buses in this embodiment. The data on each of the buses 305, 310 is provided as an input to the multiplexers 315, 320, thereby providing each multiplexer with 4N bits of data.

The multiplexer 315 selects a plurality of (N/2)-bit data words from the 4N bits of data. The (N/2)-bit data words are output in pairs to the ALUs 330, 350. The ALUs 330, 350 in combination with the multiplexers 340, 360 process the (N/2)-bit data sets to obtain an absolute difference between the data sets.

The throughput of the DSP 300 is improved by increasing the number of components in the first stage. The multiplexer 320 selects a plurality of (N/2)-bit data words from the 4N bits of data and outputs the data in pairs to the ALUs 335, 355. The ALUs 335, 355 in combination with the multiplexers 345, 365 process the (N/2)-bit data sets to obtain an absolute difference between the data sets. By having four ALUs 330, 335, 350, and 355, the DSP 300 can process eight (N/2)-bit data sets in each pass.

The absolute differences obtained in the first stage are combined in the second stage. The second stage includes ALUs 367, 369 and flops 370, 372. The multiplier 135 from DSP 100 is segmented into a plurality of ALUs 367, 369. Because the components that compose the multiplier 135 are used to create the ALUs 367, 369, no additional hardware is needed on the DSP 300 for the second stage.

The ALU 367 receives the two (N/2)-bit outputs from the first stage ALU-multiplexer combinations 330–340, 350–360. The (N/2)-bit outputs are combined to create a (N/2)+1-bit output of the ALU 367. The ALU 369 receives the two (N/2)-bit outputs from the first stage ALU-multiplexer combinations 335–345, 355–365. The (N/2)-bit outputs are combined to create a (N/2)+1-bit output of the ALU 369. The series of ALUs and multiplexers in the DSP 300 creates an adder tree to ultimately provide a single SAD.

The result of the summation of the ALUs 367, 369 is transferred to the flops 370, 372. The flops 370, 372 pass the results to the multiplexers 374, 376. The multiplexers 374, 376 pass the appropriate data to the ALUs 378, 380. Two (n/2)-bit ALUs 378, 380 may be used in place of the one n-bit ALU 165 in the n-bit DSP 100 of FIG. 1. The ALU 378 takes the data from the multiplexer 374 and adds that result to the previous value of the accumulator 384. The ALU 380 takes the data from the multiplexer 376 and adds that result to the previous value of the accumulator 386.

The output of the ALU 378 is provided to the flop 382 and to the accumulator 384. The flop 382 simply contains the result of the last value of the ALU 378. The accumulator 384 value represents a total of all of the previous results from the ALU 378. The most recent output of the ALU 378 is then added to the accumulator 384. The new accumulator value is then provided in a feedback loop back to the ALU 378. The new accumulator value is also provided as an input to the multiplexer 390. The value of the flop 382 is also provided as an input to the multiplexer 390.

In a similar manner, the output of the ALU 380 may be provided to the flop 388 and to the accumulator 386. The flop 388 always contains the most recent value of the ALU 380. The accumulator 386 value represents a total of all of the previous results from the ALU 380. The most recent output of the ALU 380 is then added to the accumulator 386. The new accumulator value is then provided in a feedback loop back to the ALU 380. The new accumulator value is also provided as an input to the multiplexer 390. The value of the flop 388 is also provided as an input to the multiplexer 390.

The multiplexer 390 allows the DSP 300 to choose which value should be output by the DSP 300. Once selected, this data is sent to an output 392. Multiple DSP's 300 may be operated in parallel to achieve the desired throughput of a system.

Figure 4:
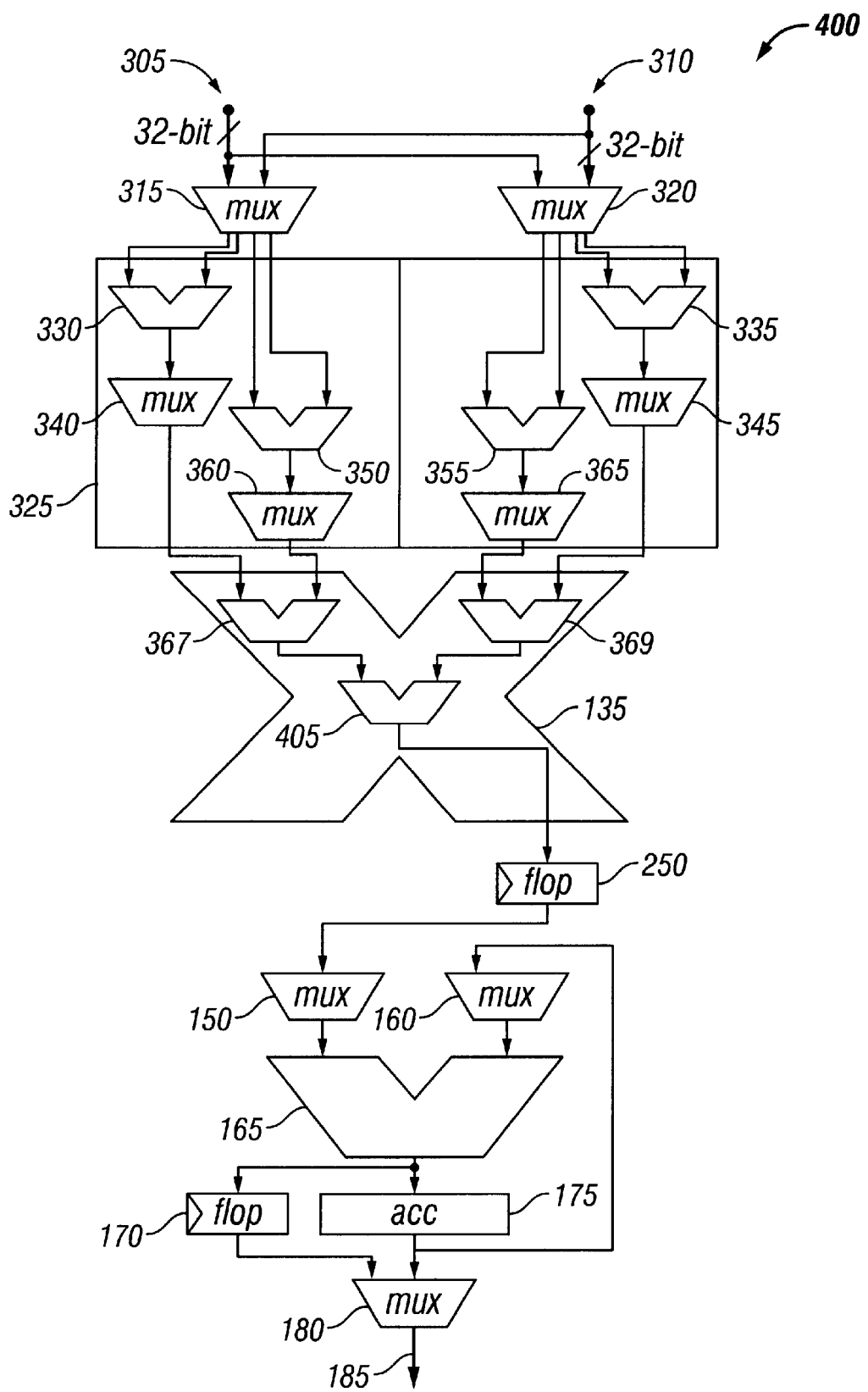
FIG. 4 a schematic of an alternative digital signal processor for one-dimensional two-level global accumulation in accordance with an embodiment of the present invention.

FIG. 4 shows a schematic of a DSP 400 providing an alternate method of accumulation according to the present invention. The DSP 400 includes a first stage identical to the DSP 300 of FIG. 3, and a third stage identical to the DSP 100 of FIG. 1. The DSP 400 has a modified second stage including ALUs 367, 369, and 405. As with the DSP 300, the absolute differences obtained in the first stage are combined in the second stage of DSP 400. In the embodiment shown in FIG. 4, the multiplier 135 from DSP 100 is segmented into a plurality of ALUs 367, 369, and 405. Therefore, the DSP 400 does not increase the silicon cost for the second stage.

The ALU 367 receives the two (N/2)-bit outputs from the first stage ALU-multiplexer combinations 330–340, 350–360. The (N/2)-bit outputs are combined to create a (N/2)+1-bit output of the ALU 367. The ALU 369 receives the two (N/2)-bit outputs from the first stage ALU-multiplexer combinations 335–345, 355–365. The (N/2)-bit outputs are combined to create a (N/2)+1-bit output of the ALU 369. Each of the (N/2)+1-bit outputs are received by the ALU 405, which combines the data to create a single (N/2)+2-bit output to send to the third stage. Because the additional combination is performed in the second stage, the split accumulators 384, 386 are not required in the third stage. The single SAD 185 may be obtained using the third stage disclosed in the DSP 100 of FIG. 1.

Figure 5:
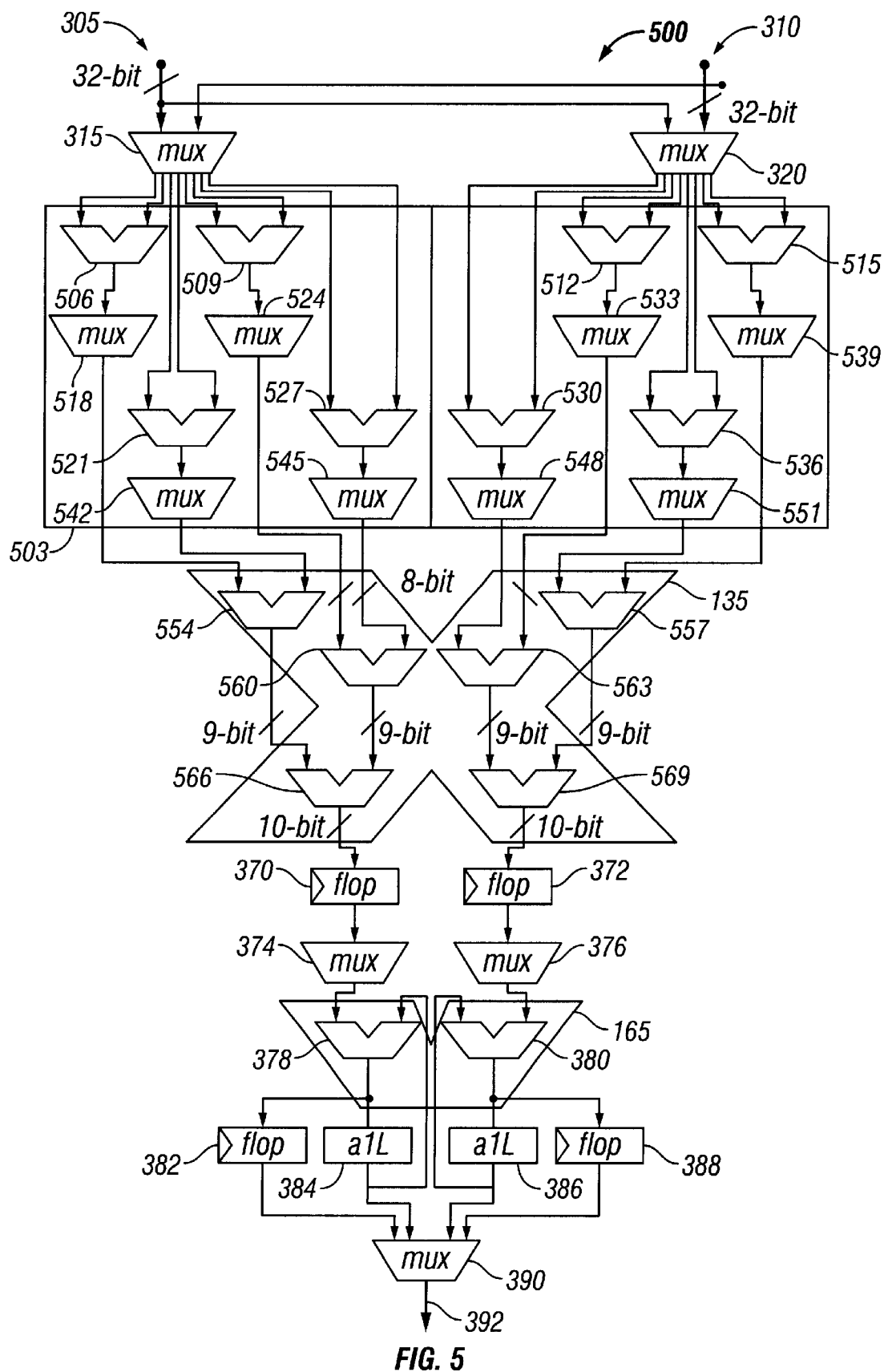
FIG. 5 a schematic of a digital signal processor for three-level dual global accumulation in accordance with an embodiment of the present invention.

FIG. 5 illustrates a DSP 500 for three-level dual global accumulation. The DSP 500 in FIG. 5 includes multiplexers 315, 320, 518, 524, 533, 539, 542, 545, 548, 551, 374, 376, 390, ALUs 506, 509, 512, 515; 521, 527, 530, 536, 554, 557, 560, 563, 566, 569, 378, 380, flops 370, 372, 382, 388 and accumulators 384, 386. The DSP 500 receives data from data buses 305, 310. The data buses 305, 310 are 2N bit data buses, or 32 bit buses in this embodiment. The data on each of the buses 305, 310 is provided as an input to the multiplexers 315, 320, thereby providing each multiplexer with 4N bits of data. However, the scope of the invention is not limited in this respect.

The multiplexer 315 selects a plurality of (N/2)-bit data words from the 4N bits of data. The (N/2)-bit data words are output in pairs to the ALUs 506, 509, 521, 527. The ALUs 506, 509, 521, 527 in combination with the multiplexers 518, 524, 542, 545, process the (N/2)-bit data sets to obtain an absolute difference between the data sets.

The multiplexer 320 selects a plurality of (N/2)-bit data words from the 4N bits of data. The (N/2)-bit data words are output in pairs to the ALUs 512, 515, 530, 536. The ALUs 512, 515, 530, 536 in combination with the multiplexers 533, 539, 548, 551, process the (N/2)-bit data sets to obtain an absolute difference between the data sets.

The throughput of the DSP 500 may be improved by increasing the number of components capable of calculating the absolute differences between data sets in the first stage. In the DSP 500, a total of eight absolute differences may be calculated in the first stage. By having eight ALUs 506, 509, 521, 527, 512, 515, 530, 536, the DSP 500 can process sixteen (N/2)-bit data sets in each pass.

Because the first stage of the DSP 500 provides eight absolute difference calculations, the second stage adds an additional level of the adder tree to process each result. The second stage includes the ALUs 554, 557, 560, 563, 566, and 569. As described above, the ALUs 554, 557, 560, 563, 566, and 569 are constructed from the multiplier 135.

The ALU 554 receives the two (N/2)-bit outputs from the first stage ALU-multiplexer combinations 506–518, 521–542. The (N/2)-bit outputs are combined to create a (N/2)+1-bit output of the ALU 554. The ALU 560 receives the two (N/2)-bit outputs from the first stage ALU-multiplexer combinations 509–524, 527–545. The (N/2)-bit outputs are combined to create a (N/2)+1-bit output of the ALU 560. The ALU 557 receives the two (N/2)-bit outputs from the first stage ALU-multiplexer combinations 536–551, 515–539. The (N/2)-bit outputs may be combined to create a (N/2)+1-bit output of the ALU 557. The ALU 563 receives the two (N/2)-bit outputs from the first stage ALU-multiplexer combinations 530–548, 512–533. The (N/2)-bit outputs are combined to create a (N/2)+1-bit output of the ALU 563.

Each of the (N/2)+1-bit outputs are received by the ALUs 566, 569, which combines the data to create a two (N/2)+2-bit output to send to the third stage. Because two (N/2)+2-bit outputs are provided to the third stage, the split accumulators 384, 386 described above with reference to DSP 300 in FIG. 3 are used to obtain a single SAD at the output 392.

The DSP according to an embodiment of the present invention may be used in place of an ASIC in devices requiring digital processing. Some examples include digital video cameras, computers, cellular telephones, and personal digital assistants. For example, the DSP of according to one embodiment of the invention may be used in a mobile video communicator with Internet access. The DSP may perform the calculations necessary to process the video data.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A digital signal processor comprising:
   a first stage having a plurality of absolute difference determinators to calculate the absolute difference of a plurality of data sets;
   a second stage to combine the absolute differences of the plurality of data sets into at least two intermediate values for two different sum of absolute differences calculations wherein the second stage is provided by reconfiguring a multiplier; and
   a third stage including at least two accumulators to accumulate each of the intermediate values to determine two sum of absolute differences values from the plurality of data sets in parallel.

2. The digital signal processor of claim 1, wherein each absolute difference determinator includes an arithmetic logic unit and a multiplexer.

3. The digital signal processor of claim 1, wherein the second stage includes at least one arithmetic logic unit.

4. The digital signal processor of claim 3, wherein the second stage provides at least two adder trees.

5. The digital signal processor of claim 1, wherein the third stage includes two accumulators to maintain a running total of the absolute differences from the first stage for each sum of absolute differences calculations.

6. The digital signal processor of claim 1, further comprising:
   two adder trees, each of the adder trees operative to combine at least a portion of the plurality of absolute differences into a sum of absolute differences.

7. The digital signal processor of claim 6, wherein at least a portion of each of the adder trees is formed from a reconfigured multiplier.

8. The digital signal processor of claim 1, wherein the plurality of data sets represents a pixel of video information.

9. The digital signal processor of claim 8, wherein each pixel of video information from each of the plurality of data segments is combined to form an image.

10. The digital signal processor of claim 1, wherein the digital signal processor is used within a video display.

* * * * *